(«12») United States Patent
Chen et al.

(10) Patent No.: US 10,053,572 B2
(45) Date of Patent: Aug. 21, 2018

(54) MASTERBATCH, METHOD FOR FABRICATING THE SAME, AND A FILM FABRICATED FROM THE MASTERBATCH

(71) Applicant: INDUSTRIAL TECHNOLOGY RESEARCH INSTITUTE, Chutung, Hsinchu (TW)

(72) Inventors: Wen-Jiunn Chen, Hsinchu (TW); Ming-Tzung Wu, Mailiao Township, Yunlin County (TW); Te-Yi Chang, Bade (TW); Chih-Hsiang Lin, Taipei (TW); Chung-Cheng Lin, Kaohsiung (TW); Meng-Hsin Chen, Xinpi Township, Pingtung County (TW)

(73) Assignee: INDUSTRIAL TECHNOLOGY RESEARCH INSTITUTE, Chutung, Hsinchu (TW)

( * ) Notice: Subject to any disclaimer, the term of this patent is extended or adjusted under 35 U.S.C. 154(b) by 1191 days.

(21) Appl. No.: 13/875,097

(22) Filed: May 1, 2013

(65) Prior Publication Data

US 2014/0030502 A1    Jan. 30, 2014

(30) Foreign Application Priority Data

Jul. 25, 2012  (TW) .............................. 101126726 A

(51) Int. Cl.
| | | |
|---|---|---|
| C08L 33/10 | (2006.01) | |
| C08K 5/053 | (2006.01) | |
| C08K 5/10 | (2006.01) | |
| C08L 67/02 | (2006.01) | |
| C08J 5/18 | (2006.01) | |
| C08J 3/22 | (2006.01) | |
| C08K 9/06 | (2006.01) | |

(52) U.S. Cl.
CPC .............. C08L 33/10 (2013.01); C08J 3/226 (2013.01); C08J 5/18 (2013.01); C08K 5/053 (2013.01); C08K 5/10 (2013.01); C08K 9/06 (2013.01); C08L 67/02 (2013.01); *C08J 2367/02* (2013.01); *C08J 2467/02* (2013.01)

(58) Field of Classification Search
None
See application file for complete search history.

(56) References Cited

U.S. PATENT DOCUMENTS

| | | | |
|---|---|---|---|
| 4,888,240 | A | 12/1989 | Graham et al. |
| 6,828,006 | B2 | 12/2004 | Takada et al. |
| 6,832,036 | B2 | 12/2004 | Ghoshal et al. |
| 6,844,033 | B2 | 1/2005 | Shimizu et al. |
| 7,649,198 | B2 | 1/2010 | Chao et al. |
| 7,858,197 | B2 | 12/2010 | Ahn et al. |
| 2009/0076198 | A1 | 3/2009 | Giesenberg et al. |
| 2010/0270238 | A1 | 10/2010 | Jang et al. |
| 2011/0088592 | A1* | 4/2011 | Chang ...................... C07F 7/21 106/170.13 |
| 2012/0029148 | A1 | 2/2012 | Chi et al. |

FOREIGN PATENT DOCUMENTS

| | | | |
|---|---|---|---|
| CN | 1616518 | A * | 5/2005 |
| CN | 1616518 | A | 5/2005 |
| CN | 101092506 | A | 12/2007 |
| CN | 101392091 | | 3/2009 |
| CN | 102152584 | A | 8/2011 |
| KR | 10-2010-0101934 | | 9/2010 |
| TW | 200946949 | A | 11/2009 |
| TW | 201038648 | | 11/2010 |
| TW | 201114828 | | 5/2011 |
| TW | 201120573 | A1 | 6/2011 |

OTHER PUBLICATIONS

Machine English Translation of CN_1616518_A; Process for in-situ preparing crystalline polyester using nano silicon dioixide; May 18, 2005; ; whole document.*
Office Action dated Mar. 2, 2015, as issued in corresponding CN Patent Application No. 201210323498.6.

* cited by examiner

*Primary Examiner* — Tahseen Khan
(74) *Attorney, Agent, or Firm* — Muncy, Geissler, Olds & Lowe, P.C.

(57) ABSTRACT

The disclosure provides a masterbatch, a method for fabricating the same and a film formed from the masterbatch. The masterbatch includes a product prepared from a composition via polymerization and granulation. The composition includes: terephthalic acid; and a silicon dioxide dispersion, wherein the silicon dioxide dispersion includes surface-modified silicon dioxide particles disposed within ethylene glycol, and the surface-modified silicon dioxide particle has first functional groups and second functional groups bonded on the surface of the silicon dioxide particles, wherein the first functional groups have a structure represented by and the second functional groups include a $C_{1-8}$ haloalkyl functional group, $C_{1-8}$ alkoxy functional group, $C_{1-8}$ aminoalkyl functional group, $C_{2-8}$ alkenyl group, or epoxy group, $R^1$ is hydrogen or a $C_{1-3}$ alkyl functional group, and n is 1-4.

18 Claims, No Drawings

MASTERBATCH, METHOD FOR FABRICATING THE SAME, AND A FILM FABRICATED FROM THE MASTERBATCH

CROSS REFERENCE TO RELATED APPLICATIONS

This application is based upon and claims the benefit of priority from the prior Taiwan Patent Application No. 101126726, filed on Jul. 25, 2012, the entire contents of which are incorporated herein by reference.

BACKGROUND

Technical Field

The technical field relates to a masterbatch and a film fabricated therefrom and, more particularly, to a masterbatch serving as an anti-caking agent and a film fabricated therefrom.

Description of the Related Art

Nanoscale silicon dioxide is used as a transparent filler for mixing with polymer material in order to enhance the surface hardness, mechanical strength and thermal resistance of polymer material. The product prepared by mixing nanoscale silicon dioxide with polymer material is widely used as a coating material, paint, a functional film, or a surface treatment of a vehicle.

Currently, nanoscale silicon dioxide is also used in the fabrication of optical films. A related disclosure discloses that the weight ratio of a nanoscale silicon dioxide cannot be more than 0.3 wt % for mixing with a triacetate cellulose to form an optical film. When the addition of the nanoscale silicon dioxide is more than 0.3 wt % (based on the weight of triacetate cellulose), the obtained optical film would have a low transparency and high haze value, and cannot meet the requirements of optical grade applications.

Therefore, it is necessary to develop a novel anti-caking agent for a film with a low haze value and high transparency.

SUMMARY

An exemplary embodiment of the disclosure provides a masterbatch, including: a product prepared from a composition via polymerization and granulation, wherein the composition comprises: a terephthalic acid; and a silicon dioxide dispersion. Particularly, the silicon dioxide dispersion includes surface-modified silicon dioxide particles disposed within ethylene glycol, wherein the surface-modified silicon dioxide particles have first functional groups and second functional groups bonded on the surface of the silicon dioxide particles. The first functional groups have a structure represented by

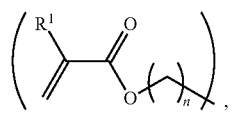

and the second functional groups comprise a $C_{1-8}$ haloalkyl functional group, $C_{1-8}$ alkoxy functional group, $C_{1-8}$ aminoalkyl functional group, $C_{2-8}$ alkenyl group, or epoxy group, $R^1$ is hydrogen or a $C_{1-3}$ alkyl functional group, and n is 1-4.

Another exemplary embodiment of the disclosure provides a method for fabricating a masterbatch, including: providing a silicon dioxide dispersion, wherein the silicon dioxide dispersion comprises surface-modified silicon dioxide particles disposed within ethylene glycol, and the surface-modified silicon dioxide particles have first functional groups and second functional groups bonded on the surface of the silicon dioxide particles, and wherein the first functional groups have a structure represented by

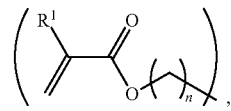

and the second functional groups comprise a $C_{1-8}$ haloalkyl functional group, $C_{1-8}$ alkoxy functional group, $C_{1-8}$ aminoalkyl functional group, $C_{2-8}$ alkenyl group, or epoxy group, $R^1$ is hydrogen or a $C_{1-3}$ alkyl functional group, and n is 1-4; mixing a terephthalic acid and the silicon dioxide dispersion together to obtain a composition; and subjecting the composition to a polymerization and granulation to obtain the masterbatch.

According to embodiments of the disclosure, the disclosure provides a film. The film is made of a blend, wherein the blend is prepared by blending a polymer with the aforementioned masterbatch.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

The disclosure provides a masterbatch serving as an anti-caking agent, method for fabricating the same, and film prepared therefrom.

The masterbatch of the disclosure has modified silicon oxide particles, and a film is prepared from the masterbatch. According to an embodiment of the disclosure, due to the surface-modified silicon dioxide particles, the film prepared from the masterbatch exhibits a low static friction coefficient, and low dynamic friction coefficient, thereby improving the anti-caking properties of the film. Further, since the modified silicon oxide particles have self-dispersion properties, the film employing the same has a high transparency and low haze value.

According to an embodiment of the disclosure, the masterbatch can include a product prepared from a composition via polymerization and granulation, wherein the composition includes: terephthalic acid (terephthalic acid, TPA); and a silicon dioxide dispersion, wherein the silicon dioxide dispersion can include surface-modified silicon dioxide particles disposed within ethylene glycol.

The surface-modified silicon dioxide particles have first functional groups and second functional groups, wherein the first functional groups and second functional groups can be bonded on the surface of the silicon dioxide particle. It should be noted that the first functional groups can be

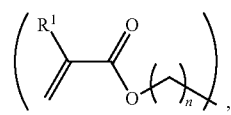

and the second functional groups can be a functional group which is a hydrogen bond acceptor or donor, such as $C_{1-8}$ haloalkyl functional group, $C_{1-8}$ alkoxy functional group, $C_{1-8}$ aminoalkyl functional group, $C_{2-8}$ alkenyl group, or epoxy group, and $R^1$ is hydrogen or a $C_{1-3}$ alkyl functional group, and n is 1-4. According to an embodiment of the disclosure, the weight ratio of the first functional groups and second functional groups can be 10-50 wt %, based on the weight of the surface-modified silicon dioxide particles. The silicon dioxide dispersion can have a solid content of 5-20 wt %. Namely, the surface-modified silicon dioxide particles have a weight ration of 5-20 wt %, based on the weight of the silicon dioxide dispersion. Further, the surface-modified silicon dioxide particles can have a particle size of 1-100 nm, and the masterbatch can have an absolute viscosity of 0.55-0.7.

According to an embodiment of the disclosure, the surface-modified silicon dioxide particle can include a product prepared from the following components via hydrolysis and condensation. For example, an aqueous solution containing silicon oxide particles, a compound having a structure represented by Formula (I), and a compound having a structure represented by Formula (II)

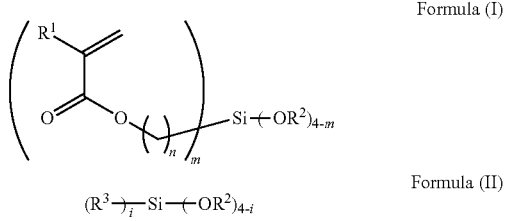

Formula (I)

Formula (II)

wherein $R^1$ are independently selected from hydrogen, or a $C_{1-3}$ alkyl group (such as methyl group, or ethyl group), $R^2$ are independently selected from hydrogen, or a $C_{1-6}$ alkyl group, and $R^3$ are independently selected from a $C_{1-8}$ haloalkyl functional group, $C_{1-8}$ alkoxy functional group, $C_{1-8}$ aminoalkyl functional group, $C_{2-8}$ alkenyl group, or epoxy group. Further, n can be 1-4, in can be 1-2, and i can be 1-2. For example, the compound having a structure represented by Formula (I) can be 3-(trimethoxysilyl)-propyl methacrylate), and the compound having a structure represented by Formula (II) can be 3,3,3-trifluoro propyl trimethoysilane, N-ethylaminopropyl trimethoysilane, 3-aminopropyl)triethoysilane, 3-chloropropyl trimethoxysilane, vinyltrimethoxysilane, or Glycidoxypropyltrimethoxysilane.

According to other embodiments of the disclosure, the disclosure provides a method for fabricating the aforementioned masterbatch. The method includes the following steps. First, the aforementioned silicon dioxide dispersion is provided. Next, a terephthalic acid is provided to mix with the silicon dioxide dispersion, obtaining a composition. Next, the composition is stirred at 200-280° C. to undergo an esterification reaction. After the reaction is completed, the result is subjected to an in-situ polymerization at 250-300° C. under vacuum to form a polyester, wherein a catalyst (such as $Sb_2O_3$) can be added during polymerization. Finally, the polyester is subjected to melting and extrusion processes under a nitrogen atmosphere. After cooling the product is diced to obtain the masterbatch having surface-modified silicon dioxide particles.

The masterbatch of the disclosure can be further blended with a polymer (such as polyethylene terephthalate) and extrusion molded to form a film by a continuous extruder. The weight ratio between the polymer and the masterbatch can be from 99:1 to 80:20. Due to the addition of the masterbatch having surface-modified silicon dioxide particles, the anti-caking property of the silicon dioxide particles in the film can be improved. The film can have a thickness of 1-500 nm, and the film can have a static friction coefficient of 0.3-2.0, a dynamic friction coefficient of 0.2-0.9, a haze value of 0.1-1.0, and a transparency of not less than 85%. Therefore, the film is suitable as an optical film used in optoelectronic devices.

The following examples are intended to illustrate the disclosure more fully without limiting the scope of the disclosure, since numerous modifications and variations will be apparent to those skilled in this art.

Preparation of Surface-Modified Silicon Dioxide Particles

Preparation Example 1

50 g of the silicon dioxide sol (dispersed in $H_2O$, wherein the weight ratio of the silicon dioxide is 20 wt %, and the average particle size of the silicon dioxide is 30±6 nm, manufactured and sold by Chang Chun Plastics Co., Ltd with at de name of nano sol), 12 g of 3-(trimethoxysilyl)-propyl methacrylate and 3 g of 3-chloropropyl trimethoxysilane were mixed and reacted at 40° C. for 4 hrs. After stirring for 48 hrs at room temperature, surface-modified silicon dioxide particles (A) having methacrylate and 3-chloropropyl groups were obtained. Next, the decomposition temperature and the weight ratio of surface-modified functional group of the surface-modified silicon dioxide particles (A) were measured, and the results are shown in Table 1.

Next, ethylene glycol was provided to mix with the surface-modified silicon dioxide particles (A), obtaining a silicon dioxide dispersion (A) (with a solid content of 10%, wherein the average particle size of the surface-modified silicon dioxide particles (A) was 32±5 nm).

Preparation Example 2

50 g of the silicon dioxide sot (dispersed in $H_2O$, wherein the weight ratio of the silicon dioxide is 20 wt %, and the average particle size of the silicon dioxide is 30±6 nm, manufactured and sold by Chang Chun Plastics Co., Ltd with a trade name of nano sol), 14 g of 3-(trimethoxysilyl)-propyl methacrylate and 2 g of (3,3,3,Trifluoro propyl) trimethoysilane were mixed and reacted at 40° C. for 4 hrs. After stirring for 48 hrs at room temperature, surface-modified silicon dioxide particles (B) having methacrylate and trifluoro propyl groups were obtained. Next, the decomposition temperature and the weight ratio of surface-modified functional group of the surface-modified silicon dioxide particles (B) were measured, and the results are shown in Table 1.

Next, ethylene glycol was provided to mix with the surface-modified silicon dioxide particles (B), obtaining a silicon dioxide dispersion (B) (with a solid content of 10%, wherein the average particle size of the surface-modified silicon dioxide particles (B) was 30±5 nm).

Preparation Example 3

50 g of the silicon dioxide sol (dispersed in $H_2O$, wherein the weight ratio of the silicon dioxide is 20 wt %, and the average particle size of the silicon dioxide particles is 30±6 nm, manufactured and sold by Chang Chun Plastics Co., Ltd with a trade name of nano sol), 14.5 g of 3-(trimethoxysilyl)-propyl methacrylate and 0.5 g N-methylaminopropyl trimethoysilane were mixed and reacted at 40° C. for 4 hrs. After stirring for 48 hrs at room temperature, surface-modified silicon dioxide particles (C) having methacrylate and N-methylaminopropyl groups were obtained. Next, the decomposition temperature and the weight ratio of surface-modified functional group of the surface-modified silicon dioxide particles (C) were measured, and the results are shown in Table 1.

Next, ethylene glycol was provided to mix with the surface-modified silicon dioxide particles (C), obtaining a silicon dioxide dispersion (C) (with a solid content of 10%, wherein the average particle size of the surface-modified silicon dioxide particles (C) was 50±5 nm).

Preparation Example 4

50 g of the silicon dioxide sol (dispersed in $H_2O$, wherein the weight ratio of the silicon dioxide is 20 wt %, and the average particle size of the silicon dioxide particles is 30±6 nm, manufactured and sold by Chang Chun Plastics Co., Ltd with a trade name of nano sol), 13.5 g of 3-(trimethoxysilyl)-propyl methacrylate and 1.5 g of 3-aminopropyl triethoysilane were mixed and reacted at 40° C. for 4 hrs. After stirring for 48 hrs at room temperature, surface-modified silicon dioxide particles (D) having methacrylate and aminopropyl groups were obtained. Next, the decomposition temperature and the weight ratio of surface-modified functional group of the surface-modified silicon dioxide particles (D) were measured, and the results are shown in Table 1.

Next, ethylene glycol was provided to mix with the surface-modified silicon dioxide particles (D), obtaining a silicon dioxide dispersion (D) (with a solid content of 10%, wherein the average particle size of the surface-modified silicon dioxide particles (D) was 20±5 nm).

Preparation Example 5

50 g of the silicon dioxide sol (dispersed in $H_2O$, wherein the weight ratio of the silicon dioxide is 20 wt %, and the average particle size of the silicon dioxide particles is 30±6 nm, manufactured and sold by Chang Chun Plastics Co., Ltd with a trade name of nano sol), 12 g of 3-(trimethoxysilyl)-propyl methacrylate and 1.5 g of 3,3,3-trifloro propyl trimethoxysilane were mixed and reacted at 40° C. for 4 hrs. After stirring for 48 hrs at room temperature, surface-modified silicon dioxide particles (E) having methacrylate and trifloropropyl groups were obtained. Next, the decomposition temperature and the weight ratio of surface-modified functional group of the surface-modified silicon dioxide particles (E) were measured, and the results are shown in Table 1.

Next, ethylene glycol was provided to mix with the surface-modified silicon dioxide particles (E), obtaining a silicon dioxide dispersion (E) (with a solid content of 10%, wherein the average particle size of the surface-modified silicon dioxide particles (E) was 31±5 nm).

Preparation Example 6

50 g of the silicon dioxide sol (dispersed in $H_2O$, wherein the weight ratio of the silicon dioxide is 20 wt %, and the average particle size of the silicon dioxide is 30±6 am, manufactured and sold by Chang Chun. Plastics Co., Ltd with a trade name of nano sol), 12 g of 3-(trimethoxysilyl)-propyl methacrylate and 1.5 g of hydroxy methyl triethoxysilane were mixed and reacted at 40° C. for 4 hrs. After stirring for 48 hrs at room temperature, surface-modified silicon dioxide particles (F) having methacrylate and methoxy groups were obtained. Next, the decomposition temperature and the weight ratio of surface-modified functional group of the surface-modified silicon dioxide particles (F) were measured, and the results are shown in Table 1.

Next, ethylene glycol was provided to mix with the surface-modified silicon dioxide particles (F), obtaining a silicon dioxide dispersion (F) (with a solid content of 10%, wherein the average particle size of the surface-modified silicon dioxide particles (F) was 33.4±5 nm).

TABLE 1

| | decomposition temperature (° C.) | weight ratio of surface-modified functional group (wt %) (based on the weight of the modified silicon oxide particles) |
|---|---|---|
| surface-modified silicon dioxide particles (A) | 285.5 | 32.68 |
| surface-modified silicon dioxide particles (B) | 285.4 | 30.28 |
| surface-modified silicon dioxide particles (C) | 287.1 | 32.77 |
| surface-modified silicon dioxide particles (D) | 288.1 | 31.49 |
| surface-modified silicon dioxide particles (E) | 285.7 | 31.45 |
| surface-modified silicon dioxide particles (F) | 287.2 | 30.3 |

(Remark: The method for measuring the weight ratio of surface-modified functional group included the following steps. First, the surface-modified silicon dioxide dispersion was disposed in an oven at 105° C. for 3 hrs. Next, the dried surface-modified silicon dioxide was cooled down to room temperature for 6 hrs. Next, the obtained surface-modified silicon dioxide was heated under a nitrogen atmosphere, and the weight loss per unit time of the surface-modified silicon dioxide was measured by thermogravimetric analyzer (TGA). Hence, the weight ratio of surface-modified functional group was estimated according to the weight loss of surface-modified silicon dioxide particles at the decomposition temperature.)

Preparation of the Masterbatch Modified Silicon Oxide Particles

Example 1

100 g of the silicon dioxide dispersion (A) (Preparation Example 1), and 166 g of terephthalic acid (TPA) were mixed and reacted at 260° C. to undergo an esterification reaction. After the reaction was completed, 0.1 g of $Sb_2O_3$ (serving as catalyst) was added into the result, and the mixture was heated to 270° C. under vacuum to perform an in-situ polymerization, obtaining a polyester.

Next, the nitrogen gas was introduced to the reactor, and the polyester was subjected to melting and extrusion processes under a nitrogen atmosphere. After cooling, the product was diced to obtain the masterbatch (A) (having surface-modified silicon dioxide particles).

The properties of the masterbatch (A) were estimated, and the results are shown in Table 2.

Example 2

Example 2 was performed using the method for preparing the masterbatch (A) as described in Example 1 except that the silicon dioxide dispersion (A) was replaced with the silicon dioxide dispersion (B) of Preparation Example 2, obtaining the masterbatch (B).

Example 3

Example 3 was performed using the method for preparing the masterbatch (A) as described in Example 1 except that the silicon dioxide dispersion (A) was replaced with the silicon dioxide dispersion (C) of Preparation Example 3, obtaining the masterbatch (C).

Example 4

Example 4 was performed using the method for preparing the masterbatch (A) as described in Example 1 except that the silicon dioxide dispersion (A) was replaced with the silicon dioxide dispersion (D) of Preparation Example 4, obtaining the masterbatch (D).

The properties of the masterbatch (D) were estimated, and the results are shown in Table 2.

Example 5

Example 5 was performed using the method for preparing the masterbatch (A) as described in Example 1 except that the silicon dioxide dispersion (A) was replaced with the silicon dioxide dispersion (E) of Preparation Example 5, obtaining the masterbatch (E).

The properties of the masterbatch (E) were estimated, and the results are shown in Table 2.

Example 6

Example 6 was performed using the method for preparing the masterbatch (A) as described in Example 1 except that the silicon dioxide dispersion (A) was replaced with the silicon dioxide dispersion (F) of Preparation Example 6, obtaining the masterbatch (F).

The properties of the masterbatch (F) were estimated, and the results are shown in Table 2.

Comparative Example 1

10 g of a silicon dioxide powder (non-modified), and 90 g of ethylene glycol were added into a reaction bottle to form a silicon dioxide dispersion (with a solid content of 10%) after mixing. Next, 166 g of terephthalic acid (TPA) was added into the bottle and reacted at 260° C. to undergo an esterification reaction. After the reaction was completed, 0.1 g of $Sb_2O_3$ (serving as catalyst) was added into the result, and the mixture was heated to 270° C. under vacuum to perform an in-situ polymerization, obtaining a polyester.

Next, the nitrogen gas was introduced to the reactor, and the polyester was subjected to melting and extrusion processes under a nitrogen atmosphere. After cooling, the product was diced to obtain the masterbatch (G) (having non-modified silicon dioxide particles).

The properties of the masterbatch (G) were estimated, and the results are shown in Table 2.

TABLE 2

| | surface modified functional group | IV value | acid value | Tg (° C.) | Tm (° C.) |
|---|---|---|---|---|---|
| masterbatch (A) | methacrylate group, and methoxy group | 0.58 | 13.4 | 76.31 | 246.42 |
| masterbatch (D) | methacrylate group, and aminopropyl group | 0.56 | 9.21 | 79.67 | 252.72 |
| masterbatch (E) | methacrylate group, and trifloropropyl group | 0.64 | 28.0 | 78.56 | 250.01 |
| masterbatch (F) | methacrylate group, and methoxy group | 0.59 | 12.8 | 74.94 | 248.13 |
| masterbatch (G) | none | 0.616 | 31.5 | 78.71 | 249.77 |
| Pure polyethylene terephthalate | — | 0.641 | 32.1 | 62.80 | 249.90 |

As shown in Table 2, in comparison with pure polyethylene terephthalate, the glass transition temperature (Tg) of the masterbatch having modified silicon oxide particles of the disclosure was higher by 19%.

Preparation of the PET Optical Film

Example 7

The masterbatches (A) and (D)-(F) were respectively blended with pure polyethylene terephthalate grain, wherein the weight ratio between the masterbatches and pure polyethylene terephthalate grain was 1:9. After drying under vacuum for 8 hrs, the blends were extrusion molded to form films (with a thickness of 350 μm) by a continuous extruder. Next, the films were extruded in a machine direction (MD) and in a transverse direction (TD), respectively obtaining PET optical films (1)-(4) (with a thickness of 38±2 μm). Next, the static friction coefficient, dynamic friction coefficient, haze value, and transparency of the PET optical films (1)-(4) were measured, and the results are shown in Table 3.

Comparative Example 2

300 g of the non-modified masterbatch (G) (prepared from Comparative Example 1) was blended with 2700 g of pure polyethylene terephthalate grain. After drying under vacuum for 8 hrs, the blends were extrusion molded to form films (with a thickness of 350 μm) by a continuous extruder. Next, the films were extruded in a machine direction (MD) and in a transverse direction (ITD), obtaining a PET optical film (5) (with a thickness of 38±2 μm). Next, the static friction coefficient, dynamic friction coefficient, haze value, and transparency of the PET optical film (5) were measured, and the results are shown in Table 3. The PET optical film (5) had a haze value of more than 2.5, and a transparency of less than 75%,

TABLE 3

| | masterbatch | dynamic friction coefficient | static friction coefficient | haze value | transparency |
|---|---|---|---|---|---|
| PET optical film (1) | masterbatch (A) | 0.433 | 0.427 | 0.6 | 85% |
| PET optical film (2) | masterbatch (D) | 0.23 | 0.214 | 0.25 | 90.01% |
| PET optical film (3) | masterbatch (E) | 0.46 | 0.391 | 0.5 | 86% |

TABLE 3-continued

| | masterbatch | dynamic friction coefficient | static friction coefficient | haze value | transparency |
|---|---|---|---|---|---|
| PET optical film (4) | masterbatch (F) | 0.257 | 0.264 | 0.35 | 87% |
| PET optical film (5) | masterbatch (G) | 0.59 | 0.31 | 2.3 | 70% |
| Pure PET film | — | ≥1.0 | ≥1.0 | 0.63 | 90.03% |

(Remark: The maximum static friction coefficient and dynamic friction coefficient was measured by a tensile testing machine (MXD-02) in accordance with ASTM D-1894. The haze value and transparency was measured by a turbidimeter at a wavelength of between 400-700 nm.)

As shown in Table 3, in comparison with a pure PET optical film, the PET optical film prepared from the masterbatch having the modified silicon oxide particles of the disclosure had a lower maximum static friction coefficient and dynamic friction coefficient, and the haze value and transparency of the PET optical film prepared from the masterbatch of the disclosure did not deteriorate due to the addition of the silicon oxide particle. To the contrary, the PET optical film prepared from the masterbatch having non-modified silicon oxide particles had increased haze value and reduced transparency (reducing to 70%).

Accordingly, the PET (polyethylene terephthalate) optical film prepared from the masterbatch having the modified silicon oxide particles of the disclosure have high anti-caking properties due to the low static friction coefficient and dynamic friction coefficient. Further, since the modified silicon oxide particles are further covered by the PET, the dust generation and accumulation of the modified silicon oxide particles can be avoided. Moreover, since the modified silicon oxide particles have self-dispersion properties, the PET optical film employing the same has a high transparency and low haze value.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A masterbatch, comprising:
   a product prepared from a composition via polymerization and granulation, wherein the composition comprises:
   a terephthalic acid; and
   a silicon dioxide dispersion, wherein the silicon dioxide dispersion comprises surface-modified silicon dioxide particles disposed within ethylene glycol, and the surface-modified silicon dioxide particles have first functional groups and second functional groups bonded on the surface of the silicon dioxide particles, wherein the first functional groups have a structure represented by

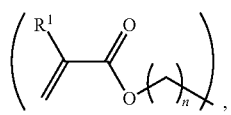

and the second functional groups comprise a $C_{1-8}$ haloalkyl functional group, $C_{1-8}$ alkoxy functional group, $C_{1-8}$ aminoalkyl functional group, $C_{2-8}$ alkenyl group, or epoxy group, $R^1$ is hydrogen or a $C_{1-3}$ alkyl functional group, and n is 1-4, wherein the weight ratio of the first functional groups and second functional groups are %30.3-32.68 wt %, based on the weight of the surface-modified silicon dioxide particles.

2. The masterbatch as claimed in claim 1, wherein the silicon dioxide dispersion has a solid content of 5-20 wt %.

3. The masterbatch as claimed in claim 1, wherein the masterbatch has an absolute viscosity of 0.55-0.7.

4. The masterbatch as claimed in claim 1, wherein the surface-modified silicon dioxide particle has a weight percentage of 1-50 wt %, based on the weight of the masterbatch.

5. The masterbatch as claimed in claim 1, wherein the surface-modified silicon dioxide particle has a particle size of 1-100 nm.

6. A film, comprising:
   a blend, wherein the blend is prepared by blending a polymer with the masterbatch as claimed in claim 1.

7. The film as claimed in claim 6, wherein the weight ratio of the polymer and the masterbatch is of between 99:1 to 80:20.

8. The film as claimed in claim 6, wherein the polymer comprises polyethylene terephthalate.

9. The film as claimed in claim 6, wherein the film has a thickness of 1-500 nm.

10. The film as claimed in claim 6, wherein the film has a static friction coefficient of 0.3-2.0.

11. The film as claimed in claim 6, wherein the film has a dynamic friction coefficient of 0.2-0.9.

12. The film as claimed in claim 6, wherein the film has a haze value of 0.1-1.0.

13. The film as claimed in claim 6, wherein the film has a transparency of not less than 85%.

14. A method for fabricating a masterbatch, comprising:
   providing a silicon dioxide dispersion, wherein the silicon dioxide dispersion comprises surface-modified silicon dioxide particles disposed within ethylene glycol, and the surface-modified silicon dioxide particles have first functional groups and second functional groups bonded on the surface of the silicon dioxide particles, wherein the first functional groups have a structure represented by

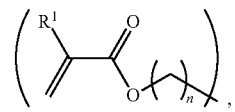

and the second functional groups comprise a $C_{1-8}$ haloalkyl functional group, $C_{1-8}$ alkoxy functional group, $C_{1-8}$ aminoalkyl functional group, $C_{2-8}$ alkenyl group, or epoxy group, $R^1$ is hydrogen or a $C_{1-3}$ alkyl functional group, and n is 1-4, wherein the weight ratio of the first functional groups and second functional groups are 30.3-32.68 wt %, based on the weight of the surface-modified silicon dioxide particles;
   mixing a terephthalic acid and the silicon dioxide dispersion together to obtain a composition; and
   subjecting the composition to a polymerization and granulation to obtain the masterbatch.

15. The method as claimed in claim 14, wherein the silicon dioxide dispersion has a solid content of 5-20 wt %.

16. The method as claimed in claim 14, wherein the masterbatch has an absolute viscosity of 0.55-0.7.

17. The method as claimed in claim 14, wherein the surface-modified silicon dioxide particle has a weight percentage of 1-50 wt %, based on the weight of the masterbatch.

18. The method as claimed in claim 14, wherein the surface-modified silicon dioxide particle has a particle size of 1-100 nm.

* * * * *